Patented Nov. 26, 1929

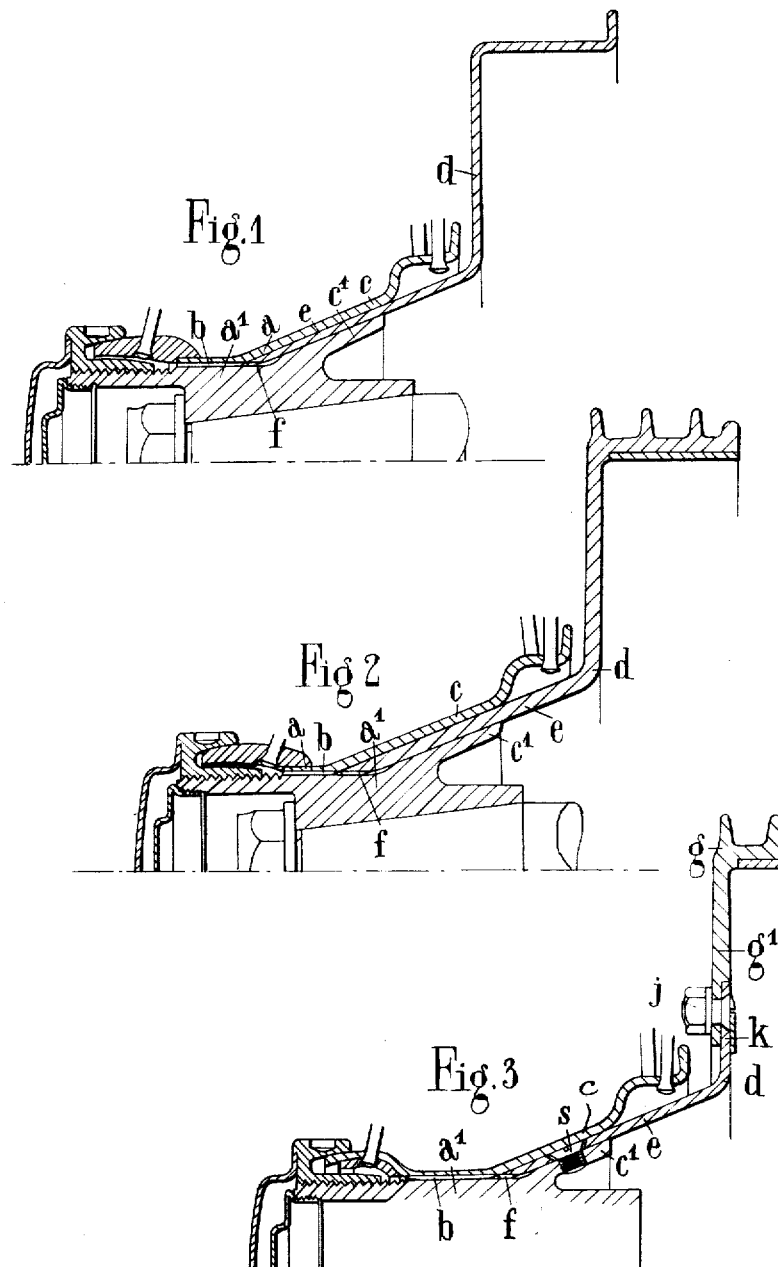

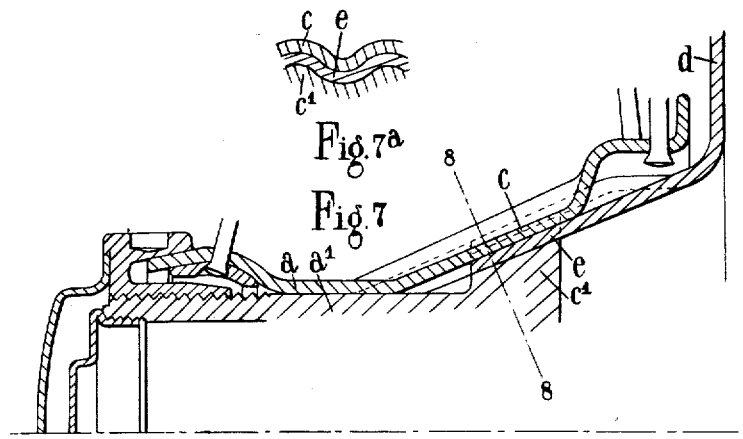
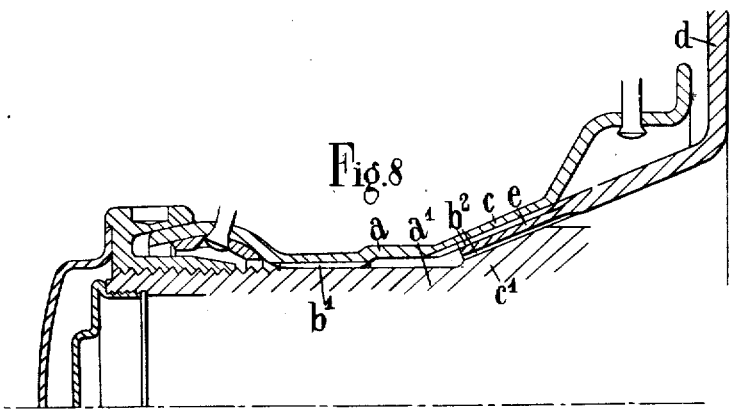
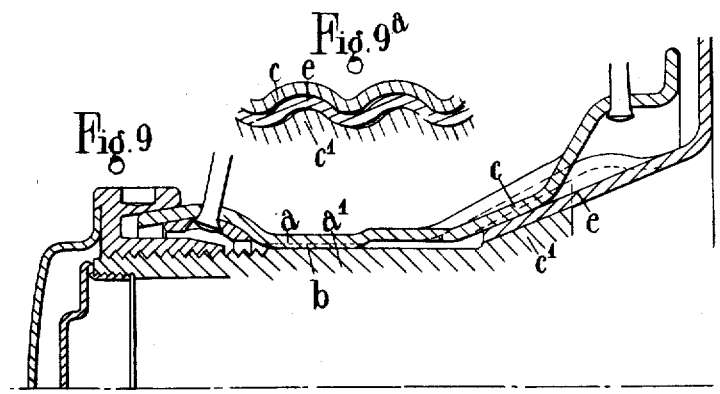

1,737,332

UNITED STATES PATENT OFFICE

JOHN VERNON PUGH AND GILBERT THOMAS BAYLISS, OF COVENTRY, ENGLAND, ASSIGNORS TO RUDGE-WHITWORTH, LIMITED, OF COVENTRY, ENGLAND

ROTATIONAL DEVICE SUCH AS VEHICLE WHEELS

Application filed October 27, 1926, Serial No. 144,615, and in Great Britain November 2, 1925.

This invention relates to the attachment of rotational elements which are connected so as to revolve in unison with axles, shafts, wheel hubs or the like.

To secure joint rotation of two parts, keys, splines and corrugations, pegs, bolts and like engaging means have been employed and in Patents Nos. 1,424,211 and 1,609,675 various forms of such engaging means are set forth.

The attachment of demountable wheel parts, brake drums and the like by means of a series of bolts arranged in a circle around the axis of rotation is also well known in many constructions.

The object of the present invention is to provide improved means for mounting one part upon another in such a manner that both the rotational engagement and centering or positioning of the parts is effected.

The invention consists in a device for mounting a large diameter element upon, and so as to rotate in unison with, one of a smaller diameter according to which a hollow conical or other tapering central region formed in the large diameter element is held between two complementary tapering abutments on separable parts of the smaller diameter element and the torsional forces are resisted by the friction and interengaging projections and recesses of the two elements, or by friction only.

The invention further consists in a device as indicated in which a large diameter element such as a brake drum is provided with a frusto-conical or other tapering centrally perforated shell of limited thickness which is gripped between complementary internal and external regions of two sleeved elements such as the two separable parts of a demountable wheel hub construction.

The invention further consists in a device in accordance with either of the preceding paragraphs in which a central perforation is provided around its edge with teeth or the like adapted to engage serrations formed in a cylindrical or like region which passes through the central perforation.

The invention further consists in a device as indicated in the preceding paragraphs in which a central perforation is provided around its edge with a screw thread of suitable dimensions adapted to engage with a similar external thread on a cylindrical or like region which passes through the central perforation.

The invention further consists in a device of the type indicated in which positive driving means such as serrations and teeth or corrugations are provided on the interengaging surfaces of the frusto-conical regions.

The invention further consists in a device as indicated in which the central shell of the larger diameter element or brake drum is provided at its smaller diameter end with a cylindrical region having suitable serrations, projections or like means for engaging with complementary surfaces on the small diameter region or inner hub part passing therethrough and on the larger diameter sleeved element or outer hub part.

The invention further consists in a device as indicated in which a separate screwed and serrated belt is provided on the inner sleeved element or hub part, said belt having a diameter somewhat greater than that of the cylindrical portion of said sleeved element, the central perforation of the large diameter or brake drum element fitting over and engaging with said belt and a circular nut being provided for retaining said large diameter element in position.

The invention also consists in a device of the type indicated in which the outer sleeved element or hub part is provided with helical serrations, inclined surfaces or the like for engaging complementary serrations or the like on the inner sleeved element or hub part and/or the large diameter or brake drum element.

The invention also consists in improvements in or relating to rotational devices such as vehicle wheels as hereinafter described.

Referring now to the accompanying drawings:—

Figure 1 shows a longitudinal section of the upper half of a detachable wheel hub of the wire-spoked type with a brake drum element retained in accordance with the present invention;

Figures 2, 3 and 4 are modifications of the above;

Figure 4:
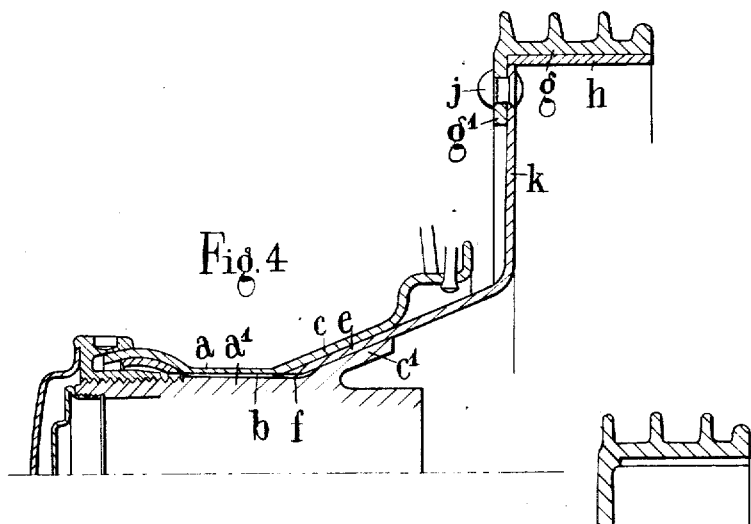

Figures 7 and $7^a$ show an alternative method of obtaining driving connection between the wheel hub and the brake drum;

Figure 8 shows a form embodying driving connections of a type described in one of the above-mentioned patents;

Figures 9 and $9^a$ show a modification of the form illustrated in Figure 7 also embodying other engaging means.

In carrying the invention into effect in one convenient form as illustrated in Figure 1, the two hub parts $a$, $a_1$ of a demountable wheel hub construction are formed so as to engage one another in their outer regions by means of complementary serrated cylindrical surfaces $b$ and upon their inner regions are provided with frusto-conical belts $c$, $c_1$, the surfaces of which are complementary to one another.

The frusto-conical belts although of complementary conicity are of such dimensions that they do not contact with one another when the outer hub is in its correct position upon the inner hub and a space of conical form of say about 1/20 to 1/4 of an inch in thickness throughout is left between the two complementary belts.

A brake drum $d$ for use with a hub construction of this kind is drawn up in the center into a frusto-conical shell $e$ which may be about 1/20 of an inch in thickness in a steel construction. This central shell is provided with a concentric aperture or perforation of the same diameter as the serrated cylindrical portions of the two hub parts, serrations $f$ being also formed around the edge of this central perforation so as to engage the teeth of the inner hub part.

The brake drum element $d$ is placed upon the inner hub part $a^1$ so that its interior engages with the frusto-conical region $c^1$ at the inner end thereof, the outer hub part $a$ being then slid on to the inner hub part in the usual manner until its complementary frusto-conical belt $c$ contacts with the exterior of the central shell $e$ of the brake drum element and holds the brake drum $d$ securely in position and in connection with the inner and outer wheel hub parts.

As shown in Figure 3 it may be convenient in some cases to provide one or more screws $s$ which pass through the thickness of the central shell $e$ of the brake drum $d$ and are screwed into tapped holes in and normal to the frusto-conical belt $c^1$ of the inner hub part $a^1$, the tops of the heads being kept below the contour of the conical region of the drum and clearance being provided in the holes to ensure correct positioning of the outer hub part upon the inner hub part.

Instead of being constructed wholly of steel a brake drum element may be formed altogether or in part of aluminium. In the former case which is illustrated in Figure 2 the space between the frusto-conical regions $c$, $c^1$ of the two hub parts $a$, $a^1$ respectively is made greater, say about 1/4 of an inch, to allow for the greater thickness of the central shell $e$ of the aluminium brake drum element $d$. In other cases as shown in Figures 3 and 4 the band or large diameter cylindrical portion $g$ of the brake drum alone may be formed of aluminium with a steel or other suitable lining $h$ for the rubbing surface, the band $g$ being provided with an inturned flange $g^1$ of any desired width which may be connected around its inner edge by means of a series of bolts or rivets $j$ with a flange $k$ of suitable proportions formed around the inner end of the central steel shell $e$ which is gripped between the two hub parts.

In constructions such as described in the previous paragraphs the ring of bolts or rivets may be positioned closely adjacent to the band of the brake drum as shown in Figure 4 so that only a very narrow internal flange $g^1$ is formed thereon and a large diameter flange $k$ on the inner end of the steel central shell element $e$ or, as illustrated in Figure 3, the brake drum band may be formed with a wider flange $g^1$ and a narrow flange $k$ only be provided upon the steel shell $e$.

Figure 5:
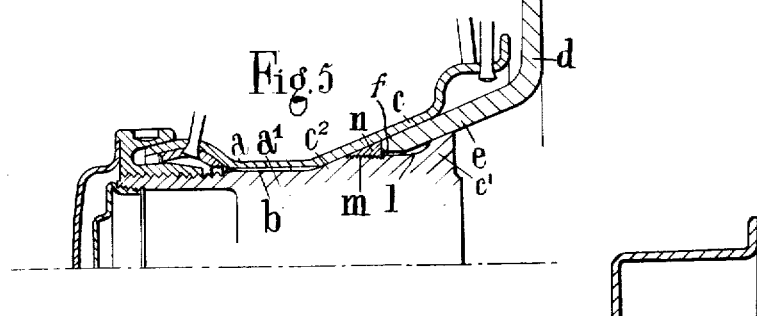
Figure 5 shows a wheel hub of the same type in which separate means are provided to assist in retaining the brake drum in position on the inner hub part.

Instead of the serrations $f$ engaging the ordinary driving serrations $b$ of the inner hub part $a_1$, a separate serrated belt $l$ as illustrated in Figure 5 of somewhat larger diameter is provided at or near to the base of the frusto-conical region $c^1$ of the inner hub part and this second serrated belt $l$ has a threaded portion $m$ of a diameter somewhat larger than the other frusto-conical region $c^2$ upon the inner hub part. A circular nut $n$ is screwed upon this threaded portion to thrust axially upon the end of the central portion $e$ of the brake drum $d$ and thereby to hold it in position upon the inner hub part irrespective of the gripping action of the conical portion $c$ of the outer hub part $a$, the nut $n$ being formed upon its outer side to follow the contour of the frusto-conical region $c^2$ of the inner hub part $a^1$ and the outer hub part being formed complementary to both the nut $n$ and the external surface of the central shell $e$ on the brake drum element.

Figure 6:
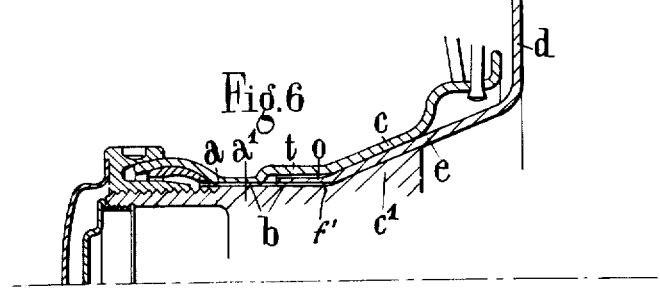
Figure 6 illustrates a modification of the wheel hubs shown in Figures 1 to 4.

In a further modification shown in Figure 6, the frusto-conical central shell of the brake drum is provided with an adjacent cylindrical region $o$ at its smaller diameter end in order to give a greater length of teeth $f'$ for engaging the serrated portion $b$ than would be provided by serrations extending only across the oblique thickness of the material as shown in the foregoing figures. In this case the outer hub part is provided with a suitable bulge $t$ for accommodating the said cylindrical portion of the central shell.

Instead of providing serrations in the wall of the central perforation of the brake drum element as described with reference to Figures 1 to 6 inclusive, a suitable screw thread may be provided which is preferably chosen of such a hand as will ensure that the brake drum tends to screw up against the inner hub part rather than unscrew against the outer hub part when the brake is applied with the vehicle running in a forward direction, such application being the most frequent and generally the most severe.

In some instances the frictional grip of the frusto-conical region may be sufficient to transmit the rotational forces or torque without any interengaging serrations and teeth or screwed portions being provided for this purpose.

In Figure 7, a suitable alternative structure is shown, the surfaces of the frusto-conical belts $c$, $e$, $c^1$ themselves being made of a waved or corrugated contour around the circumferential surface. This waving or corrugating is illustrated in Figure 7ᵃ which shows a section on the line 8—8 of Figure 7. The waves or corrugations are provided both on the exterior region of the frusto-conical part $c^1$ of the inner hub part and on the interior region of the frusto-conical part $c$ of the outer hub part, and the tapering central shell part $e$ of the brake drum element is also corrugated or waved so as to be complementary to the other two surfaces.

A further modification is shown in Figure 8 of the accompanying drawings. The outer end of the outer or wheel hub part $a$ is provided with suitable helical serrations $b^1$, the inner engaging frusto-conical regions $c$, $e$, $c^1$ of the outer hub part $a$, the brake drum shell $d$ and the inner hub part $a^1$ respectively being provided with complementary buttress serrations and teeth $b^2$ of the shape similar to those shown in the previously-mentioned Patent No. 1,609,675. These buttress serrations and teeth are provided both on the outer surface of the central shell $e$ of the brake drum $d$ and on its inner surface to engage complementary serrations on the outer and inner hub parts respectively.

In the modification illustrated in Figure 9, plain serrations or helical serrations may be employed. The outer hub part $a$ and the inner hub part $a^1$ are provided with complementary serrations on their cylindrical portions at $b$. Corrugations are provided as shown on the outer hub frusto-conical portion $e$ and engage internally with the external surfaces of corrugations on the brake drum frusto-conical portion $e$ the internal surfaces of which latter corrugations in turn bear upon waves formed on the frusto-conical portion $c^1$ of the inner hub part $a^1$. As shown in Figure 9ᵃ, one side of the corrugation on the interior of the outer hub part at $c$ pinches or grips the corrugations on the brake drum central shell $e$ against one side of the waves on the inner hub frusto-conical portion $c^1$ which elimination of rotational slackness may be effected either by the circumferential relationship of the serrations and corrugations or by the provision of helical serrations.

In one or more of the foregoing modifications of the invention, the frusto-conical central shell of the brake drum may be split at one or more locations in a plane or planes containing the axis of the cone, such splitting enabling a closer fit of the contacting surfaces to be obtained without paying so much attention to the accuracy of their form.

In one or more of the before-mentioned patents, tapering regions of multi-sided form have been employed for transmitting the torque between inner and outer hub parts and it is to be understood that a central shell of a brake drum in accordance with this invention may be formed so as to be complementary to any interengaging surfaces of this description.

Although described and illustrated in connection with brake drum elements, it is to be understood that the invention may be applied to other large diameter elements which are fitted upon smaller ones and that the constructions hereinbefore described are given by way of example and that further modifications and additions may be introduced without in any way departing from the spirit of this invention.

Having now described our invention, what we claim as new and desire to secure by Letters Patent is:—

1. In combination in a rotational device, an inner hub member having a frusto-conical portion, an outer hub member having likewise a frusto-conical portion, a brake member having a frusto-conical portion and means for gripping said frusto-conical portion of said brake member between said first-mentioned and said second-mentioned frusto-conical portions.

2. In combination in a rotational device, an inner hub member having a frusto-conical portion, an outer hub member having a frusto-conical portion, and a brake drum having a frusto-conical portion operatively disposed between said first-mentioned and said second-mentioned frusto-conical member, said frusto-conical portion of said brake member and at least one of said other frusto-conical portions having interengaging means associated respectively therewith.

3. In combination in a rotational device, an inner hub member having a frusto-conical portion, an outer hub member having likewise a frusto-conical portion, said inner and outer hub members being capable of relative axial movement for purposes of assembly and having interengaging means associated therewith, and a brake drum disposed between said first-mentioned and said second-mentioned frusto-conical portions.

4. In combination in a rotational device, an inner hub member having a frusto-conical portion, an outer hub member having likewise a frusto-conical portion and a brake member having a frusto-conical portion operatively disposed between said first-mentioned and said second-mentioned frusto-conical portions, said first-, second- and third-mentioned frusto-conical portions having a belt of interengaging means associated therewith.

5. In combination in a rotational device, an inner hub member having a frusto-conical portion, an outer hub member having likewise a frusto-conical portion, a brake member having a frusto-conical portion operatively disposed between said first-mentioned and said second-mentioned frusto-conical portions, said first-, second- and third-mentioned frusto-conical portions having a belt of interengaging corrugations and other interengaging means on said inner and outer hub members, said other interengaging means by their location relative to said corrugations causing said corrugations operatively to engage on only one side.

In testimony whereof we have signed our names to this specification.

JOHN VERNON PUGH.
G. T. BAYLISS.

CERTIFICATE OF CORRECTION.

Patent No. 1,737,332.     Granted November 26, 1929, to

JOHN VERNON PUGH ET AL.

It is hereby certified that the name of the assignee in the above numbered patent was erroneously written and printed as "Ridge-Whitworth, Limited", whereas said name should have been written and printed as "Rudge-Whitworth, Limited", as shown by the records of assignments in this office; and that the said Letters Patent should be read with this correction therein that the same may conform to the record of the case in the Patent Office.

Signed and sealed this 4th day of February, A. D. 1930.

(Seal)

M. J. Moore,
Acting Commissioner of Patents.

wise a frusto-conical portion, said inner and outer hub members being capable of relative axial movement for purposes of assembly and having interengaging means associated therewith, and a brake drum disposed between said first-mentioned and said second-mentioned frusto-conical portions.

4. In combination in a rotational device, an inner hub member having a frusto-conical portion, an outer hub member having likewise a frusto-conical portion and a brake member having a frusto-conical portion operatively disposed between said first-mentioned and said second-mentioned frusto-conical portions, said first-, second- and third-mentioned frusto-conical portions having a belt of interengaging means associated therewith.

5. In combination in a rotational device, an inner hub member having a frusto-conical portion, an outer hub member having likewise a frusto-conical portion, a brake member having a frusto-conical portion operatively disposed between said first-mentioned and said second-mentioned frusto-conical portions, said first-, second- and third-mentioned frusto-conical portions having a belt of interengaging corrugations and other interengaging means on said inner and outer hub members, said other interengaging means by their location relative to said corrugations causing said corrugations operatively to engage on only one side.

In testimony whereof we have signed our names to this specification.

JOHN VERNON PUGH.
G. T. BAYLISS.

CERTIFICATE OF CORRECTION.

Patent No. 1,737,332.    Granted November 26, 1929, to

JOHN VERNON PUGH ET AL.

It is hereby certified that the name of the assignee in the above numbered patent was erroneously written and printed as "Ridge-Whitworth, Limited", whereas said name should have been written and printed as "Rudge-Whitworth, Limited", as shown by the records of assignments in this office; and that the said Letters Patent should be read with this correction therein that the same may conform to the record of the case in the Patent Office.

Signed and sealed this 4th day of February, A. D. 1930.

(Seal)

M. J. Moore,
Acting Commissioner of Patents.